(12) United States Patent
Pham et al.

(10) Patent No.: US 12,702,533 B2
(45) Date of Patent: Aug. 11, 2026

(54) POWER DEVICE WITH FLEXIBLE CONNECTION BETWEEN A USER INTERFACE ASSEMBLY AND AN INTERNAL ASSEMBLY

(71) Applicant: KONINKLIJKE PHILIPS N.V., Eindhoven (NL)

(72) Inventors: Le Gia Pham, Bellevue, WA (US); Nathan Farrell, Kirkland, WA (US); Daniel Charles Castillo, Kenmore, WA (US); Vaughan Robson, Bothell, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 457 days.

(21) Appl. No.: 18/037,798

(22) PCT Filed: Nov. 16, 2021

(86) PCT No.: PCT/EP2021/081760
§ 371 (c)(1),
(2) Date: May 19, 2023

(87) PCT Pub. No.: WO2022/106379
PCT Pub. Date: May 27, 2022

(65) Prior Publication Data

US 2024/0008965 A1 Jan. 11, 2024

Related U.S. Application Data

(60) Provisional application No. 63/116,128, filed on Nov. 19, 2020.

(51) Int. Cl.
*A61C 17/22* (2006.01)
*H01B 7/08* (2006.01)
(Continued)

(52) U.S. Cl.
CPC ............... *A61C 17/22* (2013.01); *H01B 7/08* (2013.01); *H05K 1/181* (2013.01); *H05K 7/1417* (2013.01)

(58) Field of Classification Search
CPC .......... A61C 17/22; H01B 7/08; H05K 1/181; H05K 7/1417
See application file for complete search history.

(56) References Cited

U.S. PATENT DOCUMENTS 10,449,023 B2 10/2019 Wagner
2003/0063011 A1 4/2003 Rosen
(Continued)

FOREIGN PATENT DOCUMENTS

CN 106456302 A 2/2017
GB 1407022 A 9/1975
GB 2254194 A 9/1992

OTHER PUBLICATIONS

International Search Report and Written Opinion Dated Mar. 1, 2022 for International Application No. PCT/EP2021/081760 Filed Nov. 16, 2021.

*Primary Examiner* — Andrew A Horton

(57) ABSTRACT

A power device having a tubular housing (112) and a wired communication assembly for coupling a user interface assembly (118) and an internal assembly (114). The wired communication assembly includes a flexible ribbon cable (116) having a first end portion (138) configured to be coupled to the user interface assembly (118), a second end portion (142) configured to be coupled to the internal assembly (114), and a flexible middle portion (140). During insertion of the internal assembly (114) into the housing (112), the flexible ribbon cable (116) folds into a curved shape such that the flexible ribbon cable (116) nests inside the tubular housing (112) after the internal assembly (114) is
(Continued)

completely inserted and the flexible ribbon cable (116) does not interfere with operation of the internal assembly (114).

11 Claims, 5 Drawing Sheets

(51) Int. Cl.
*H05K 1/181* (2026.01)
*H05K 7/14* (2006.01)

(56) References Cited

U.S. PATENT DOCUMENTS

| | | | | |
|---|---|---|---|---|
| 2003/0066145 | A1 | 4/2003 | Prineppi | |
| 2005/0104556 | A1 | 5/2005 | Pfenniger et al. | |
| 2012/0182696 | A1 | 7/2012 | Sayavong | |
| 2018/0221124 | A1 | 8/2018 | Carlyle et al. | |
| 2019/0125067 | A1 | 5/2019 | Schaefer et al. | |
| 2020/0054426 | A1 | 2/2020 | Prendergast et al. | |
| 2020/0345129 | A1* | 11/2020 | Schwarz ............ | H01R 13/2428 |

* cited by examiner 124
116
112
126
100

POWER DEVICE WITH FLEXIBLE CONNECTION BETWEEN A USER INTERFACE ASSEMBLY AND AN INTERNAL ASSEMBLY

This application is the U.S. National Phase application under 35 U.S.C. § 371 of International Application No. PCT/EP2021/081760, filed on Nov. 16, 2021, which claims the benefit of U.S. Application Ser. No. 63/116,128, filed Nov. 19, 2020. These applications are hereby incorporated by reference herein.

FIELD OF THE INVENTION

The present disclosure relates generally to a power device with a wired communication assembly for coupling a user interface assembly and an internal assembly in a tubular housing, and methods of assembling such power devices.

BACKGROUND

The prevalent construction of power devices with a tubular housing, such as electric toothbrushes, involves inserting a core structure by sliding the core structure into the bottom of the tubular housing.

In the case of electric toothbrushes, the housing is often made as a single tubular piece to provide a protective barrier for the internal assembly, as well as being the main element that a user manipulates during use and control of the device. During assembly, the core structure of the toothbrush may be inserted into the housing. The core structure typically includes key function elements for the power device, such as a drive train, a battery, a printed circuit board with control elements, and user interface (UI) components such as switches and light emitting diodes (LEDs).

Flexible buttons on the outer surface of the housing may be covered with seals to prevent water intrusion. Typically, user input is achieved when a user presses on a button on the housing, which in turn interacts with switches on the internal assembly. Interactive output to user actions can be delivered via light elements on the internal assembly, which shine through transparent portions of the housing to light icons.

Some methods of user input, such as those using force/strain sensors and capacitive sensors, require that the sensor is physically connected to the backside of the UI portion of the device. In order for such sensors that are attached to the housing surface to function, the sensors must have an electrical and data connection to the internal assembly. Electrical/data interconnects, such as pogo pins or Zebra elastomeric connectors, are common elements in electronics but require a top-down assembly of the components.

None of the known interconnect methods are well-suited to the constraints arising when user interface components are attached to the internal back side of the housing and the device is constructed by sliding an internal core into the housing. Existing interconnect designs are not suitable for delivering the needed function and manufacturability. Thus, there is a need for devices that can interconnect the user interface assembly and the internal assembly in a reliable manner taking assembly and manufacturing considerations into account.

SUMMARY

According to aspects and embodiments described herein, such a need can be addressed by providing an arrangement of a flat flexible cable that reliably folds upon itself to deliver consistent interconnection in the required form factor.

In some embodiments, a power device may include a tubular housing, a user interface assembly connected to the tubular housing, and an internal assembly adapted to be inserted into the tubular housing by sliding the internal assembly along a longitudinal axis of the tubular housing. A wired communication assembly in the form of a flexible ribbon cable may be adapted to interconnect the user interface assembly and internal assembly. The flexible ribbon cable has a first end portion coupled to the user interface assembly, a flexible middle portion having a predetermined length that allows a second end portion of the flexible ribbon cable to extend out of a bottom portion of the tubular housing prior to insertion of the internal assembly into the tubular housing and that allows the second end portion of the flexible ribbon cable to be operatively coupled to the internal assembly when the internal assembly is at least partially outside of the housing. During insertion of the internal assembly into the housing, the flexible ribbon cable folds into a curved shape such that the flexible ribbon cable nests inside the tubular housing after the internal assembly is completely inserted and the flexible ribbon cable does not interfere with operation of the internal assembly.

In other implementations, the present disclosure is related to a method for assembling such a power device.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the inventive subject matter.

DETAILED DESCRIPTION OF EMBODIMENTS

The disclosed subject matter will become better understood through review of the following detailed description in conjunction with the figures. The detailed description and figures provide example embodiments of the invention described herein. Those skilled in the art will understand that the disclosed examples may be varied, modified, and altered without departing from the scope of the invention described herein.

The present disclosure describes embodiments of a wired communication assembly and its implementations as used in power devices. As disclosed herein, the wired communication assembly interconnects a user interface (UI) assembly and an internal assembly that are to be housed together in a tubular housing. The UI assembly and the internal assembly are operatively coupled with a flexible connector, such as a substantially flat, flexible ribbon cable (FRC). The FRC is adapted to be connected to both the UI assembly and the internal assembly. The connection between the FRC and internal assembly is made while the internal assembly is at least partially outside of the housing and the UI assembly is positioned inside the housing. After the connection is made, the FRC is inserted into the housing along with the internal assembly. During insertion of the internal assembly into the housing, the FRC folds into a curved shape such that the FRC nests inside the tubular housing after the internal assembly is completely inserted and the FRC does not interfere with operation of the internal assembly.

Figure 1:
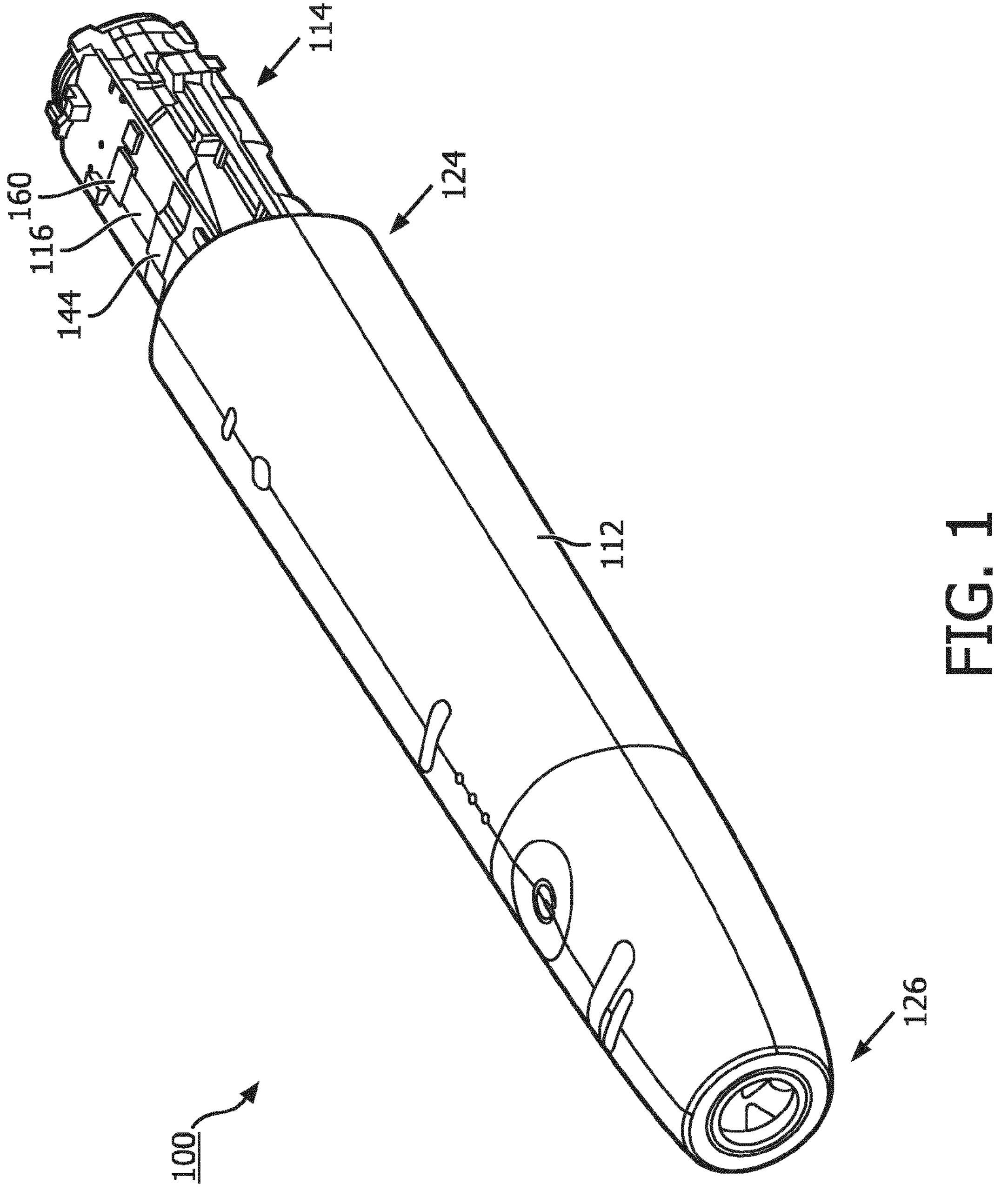
FIG. 1 is a perspective view of a housing and a partially installed internal assembly for an electric toothbrush according to an embodiment of the inventive subject matter.

FIGS. 1-5 illustrate components of an electric toothbrush as well as the assembly of the components according to an embodiment of the inventive subject matter. FIG. 1 shows a portion of an electric toothbrush 100 having a handle formed by an elongated tubular housing 112 and a portion of an internal assembly 114 extending from housing 112 as it can be inserted during assembly of the toothbrush. After assembly, housing 112 encases internal assembly 114, and housing 112 is sealed with an end cap.

Housing 112 has an elongated tubular shape and includes a bottom portion 124, also referred to as a proximal end. Housing 112 has an inside surface 128 and an outside surface 130. In some embodiments, a cross-section of housing 112 can be a generally circular cross-section. In other embodiments, the tubular shaped housing can have an octagon, oval shaped, rectangular cross-section or other suitable shape. Furthermore, the diameter of the tubular shape of housing 112 can vary in the longitudinal directions, for example as show in FIGS. 1-2 housing 120 tapers towards the distal end 126 of housing 112. Housing 112 can be made of a single molded tubular piece. In other embodiments, the housing can be made as an assembly of multiple pieces.

Figure 3:
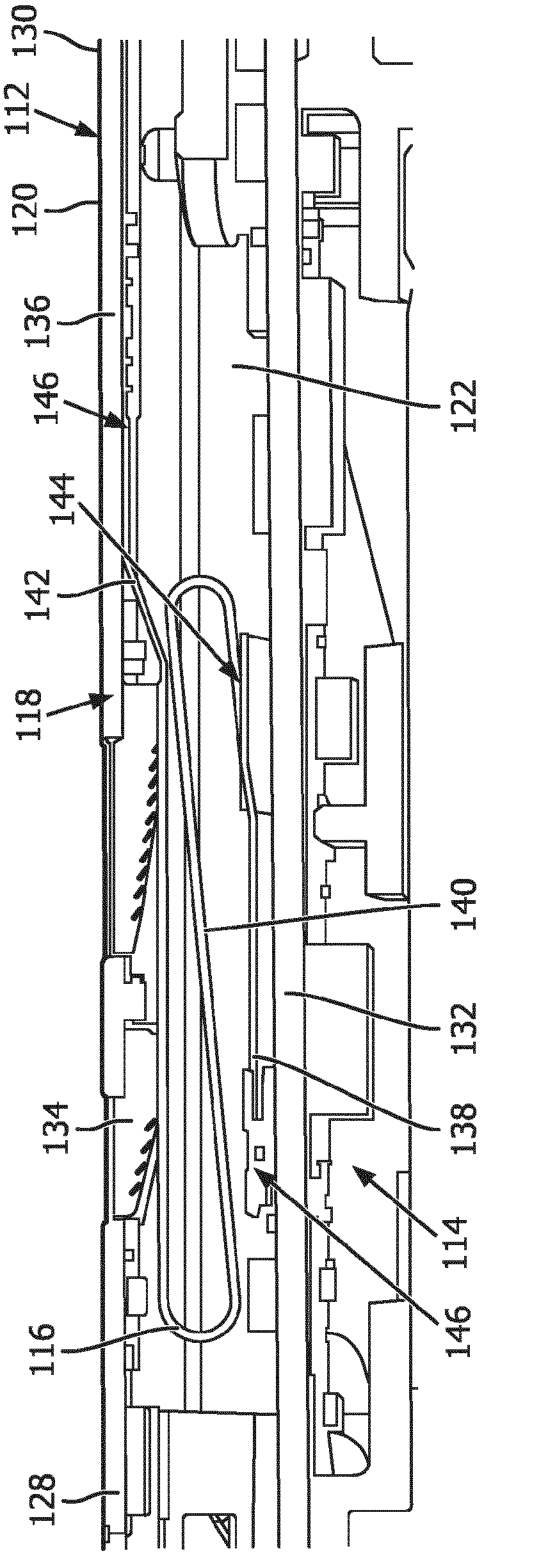
FIG. 3 is a cross-sectional view of the housing shown in FIG. 2 showing the internal arrangement after the internal assembly is inserted into the housing.

FIG. 3 shows a cross-section of housing 112 wherein internal components of the toothbrush are visible. Housing 112 has a housing wall 120 defining a cavity 122 wherein the internal components of electric toothbrush 100 are located after assembly. Internal assembly 114 is dimensioned to be disposed within housing cavity 122 where it can be supported and held in place within housing cavity 122. Internal assembly 114 may include a primary PCB 132, which supports and connects electronic components of toothbrush 100, in addition to other functional components such as a drive trains, a battery, coils, motor, and the like.

To allow user interaction, for example to accomplish mode selection or to verify a status of the toothbrush, a UI assembly 118 is provided. UI assembly includes UI elements 134, such as switches, sensors, and LEDs, mounted on a UI PCB 136. UI elements 134 may include one or more sensors and a display of icons representing a series of cleaning modes or other oral care modes. The term "user interface (UI)" as used herein refers to an interface between a human user or operator and one or more devices that enables communication between the user and the device(s). Examples of user interface elements that may be employed in various implementations of the present disclosure include, but are not limited to, force sensors, capacity sensors, switches, potentiometers, buttons, dials, sliders, track balls, display screens, various types of graphical user interfaces (GUIs), touch screens, microphones and other types of sensors that may receive some form of human-generated stimulus and generate a signal in response thereto.

To accomplish the desired functionality of toothbrush 100, internal assembly 114 and UI assembly 118 are operatively coupled via a flexible ribbon cable (FRC) 116. UI assembly 118 includes a UI PCB 136 which can be attached to inside surface 128 of housing 112, for example via a double-sided adhesive tape, with a thick liquid adhesive, or other suitable means. In other embodiments, portions of the user interface assembly may be integrated with the housing or form part of a panel that is incorporated in the housing.

FRC 116 allows power, data or signal communication between primary PCB 132 and UI PCB 136. To accommodate electrical and data communications between the PCBs, FRC 116 has an appropriate number of wires and associated contacts. In some embodiments, FRC 116 can be coupled to one or more UI elements, either directly or indirectly.

As can be seen in FIG. 3, FRC 116 has a first end portion 138, a flexible middle portion 140, and a second end portion 142. First end portion 138 is affixed to UI assembly 118 which in turn is coupled to inside surface 128 of housing 112. FRC 116 can be a custom designed cable having a predetermined length, width and thickness. The predetermined length of flexible middle portion 140 of FRC 116 allows second end portion 142 of FRC 116 to extend out of the proximal end 124 of housing 112 while first end portion 138 of FRC 116 is coupled to UI assembly 118. The extension out of housing 112 allows second end portion 142 of FRC 116 to be operatively coupled to internal assembly 114 when internal assembly 114 is at least partially outside of housing 112. The predetermined length can be any length that is sufficient to allow the connections to the PCBs to be made while also leaving slack in the cable at specific points such that the cable can bend and fit in the space of the housing between internal assembly and UI assembly such that the presence of the FRC within the housing cavity does not affect the operation of internal components of the toothbrush. In other embodiments, FRC 116 can be a standard flex cable having a length long enough to extend outside the housing when attached to the UI assembly such that during a manual assembly operation the connection between the FRC and a connector of the primary PCB be made quickly and ergonomically.

Figure 2:
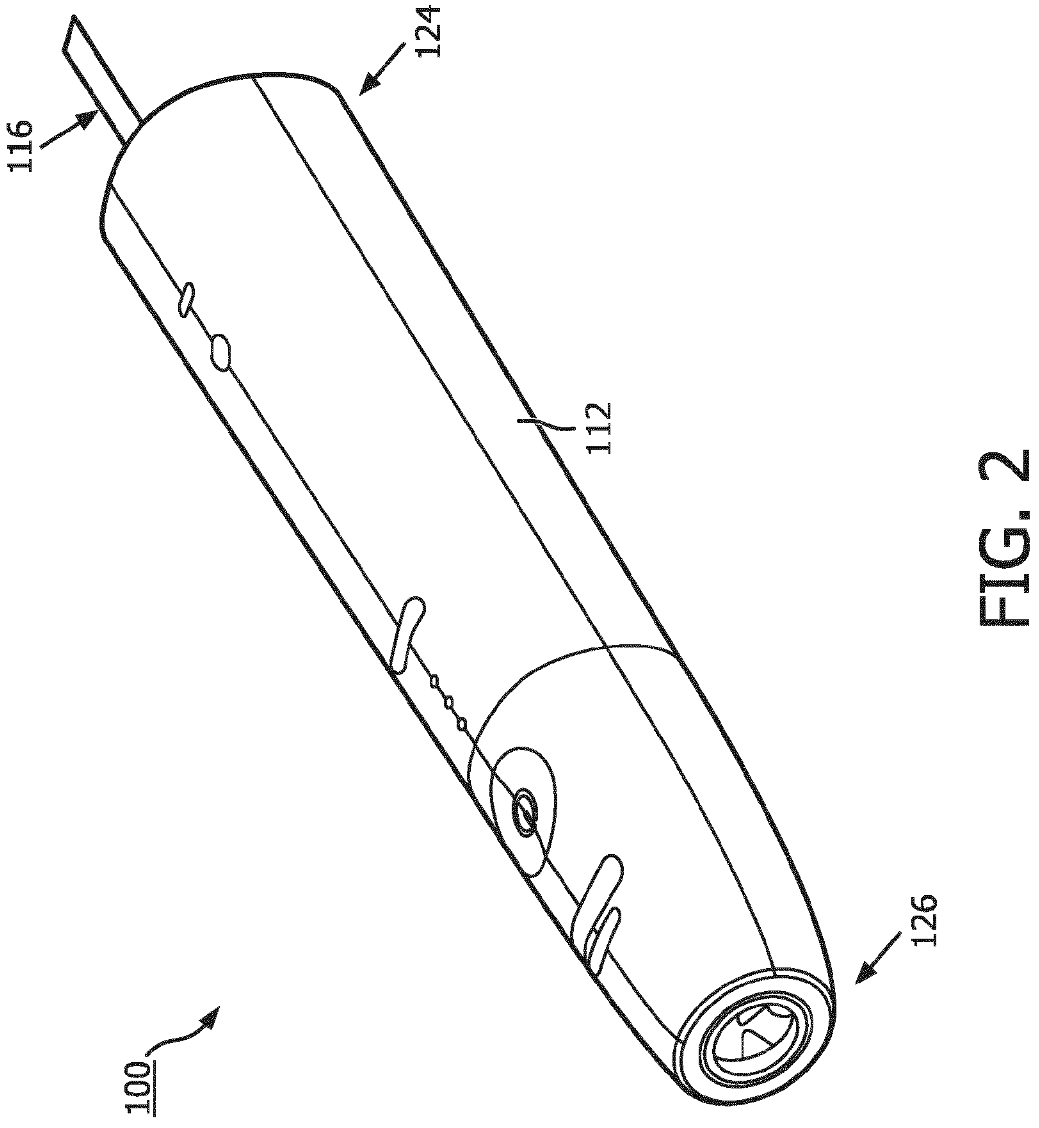
FIG. 2 is a perspective view of the housing of FIG. 1 with a flexible ribbon cable extending from the housing.

First end portion 138 of FRC 116, as well as other components, can be coupled to UI PCB 136 prior to insertion. After attachment of FRC 116, and other components, to UI PCB 136, the UI PCB assembly is inserted into housing 112 and attached to housing wall 120, for example by soldering. When UI PCB 136 is in place in housing 112, second end portion 142 of FRC 116 extends out of housing 112, as shown in FIG. 2.

To accomplish the connection with internal assembly 114, internal assembly 114 is partially inserted into housing 112, as shown in FIG. 1. Second end portion 142 of FRC 116 can be coupled to primary PCB 132, for example via a board mount connector 160 and with solder pads matching the connector. A constraint member, such as strain relief member 144 discussed below, can be mounted on primary PCB 132, to prevent second end 142 of FRC 116 from being dislodged.

Figure 4:
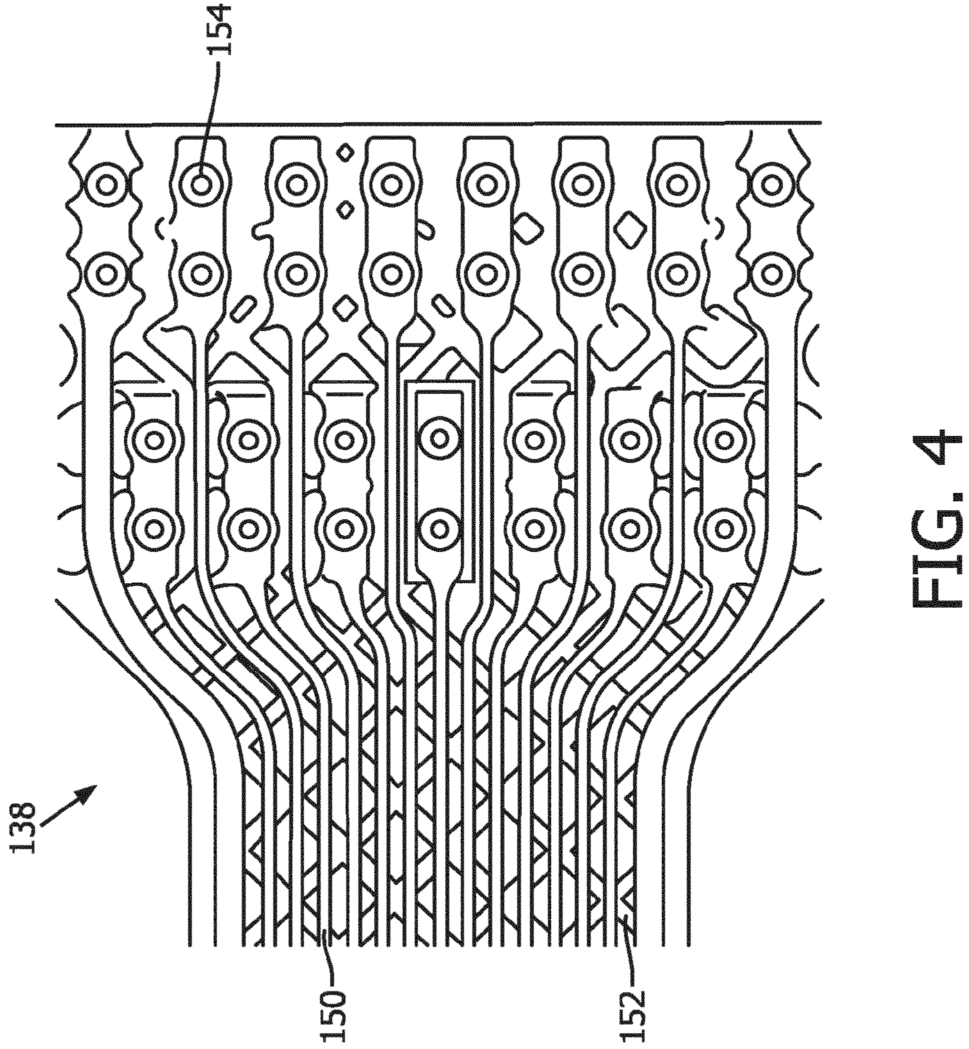
FIG. 4 is a top view of a first end of a flexible ribbon cable showing the presence of vias.
Figure 5:
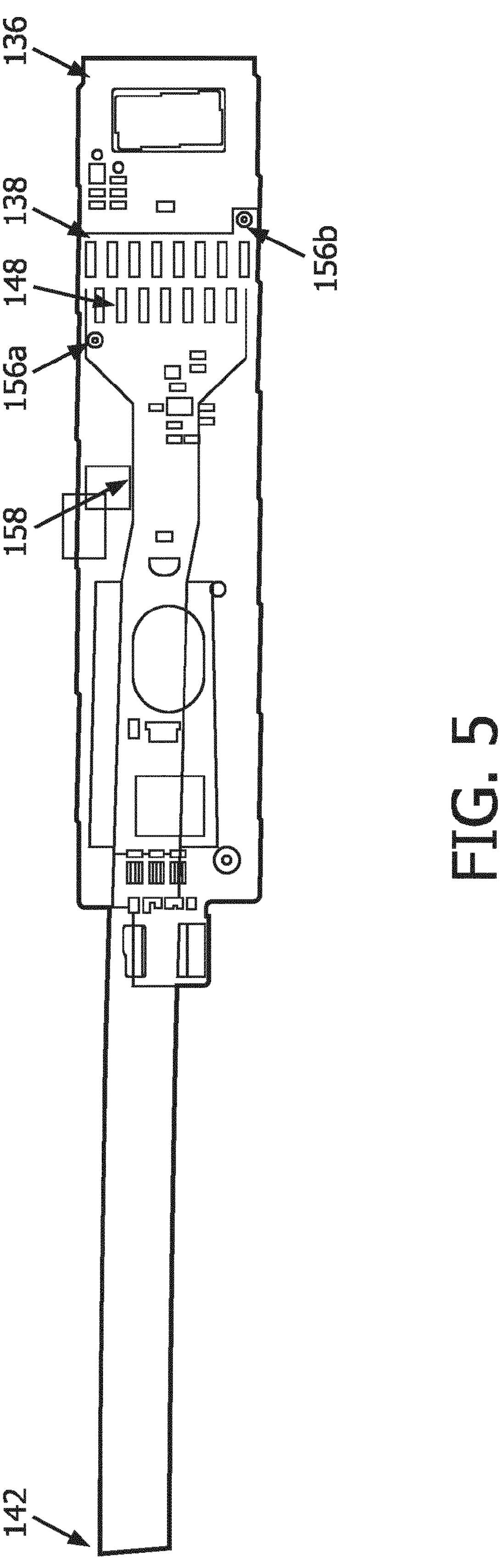
FIG. 5 is a top view of the flexible ribbon cable and the user interface printed circuit board illustrating how the flexible ribbon cable is applied to the user interface printed circuit board.

As shown in FIGS. 4 and 5, FRC 116 may includes a plurality of conductors 150 that run substantially parallel through the cable, and electrical insulation 152 surrounding and separating conductors 150. At first end portion 138 of FRC 116, contact regions 146 are on a top side 148 of FRC 116. Conductors 150 of FRC 116 fan out at first end portion 138 such that connection solder pads can be soldered to UI PCB 136. To allow excessive solder flow and to make the solder joint strong, some vias are left open at each solder pad, such as via 154. The positioning of first end 138 of FRC 116 on UI PCB 136 can be facilitated by providing UI PCB 136 with locating holes 156*a* and 156*b* to ensure reliable soldering without possible cross contamination between pads. While located on a fixture with the help of locating holes 156*a* and 156*b*, FRC 116 can be hot bar soldered to UI PCB 136.

After a connection is made between FRC 116 and internal assembly 114, internal assembly 114 can be pushed further into housing 112 and slide along a longitudinal axis of housing 112 towards distal end 126 until it is completely inserted into housing 112 and located in its final position. During insertion, FRC 116 remains coupled to both internal assembly 114 and UI PCB 136. The connections are sufficiently strong so that they are maintained during and after assembly.

Upon assembly, flexible middle portion 140 bends, by virtue of is inherently serpentine and flexible nature, thereby allowing flexible middle portion 140 to pass back over itself and second end portion 142. After complete insertion of internal assembly 114 into housing 112, FRC 116 can resides in an S-shaped configuration inside housing 112. As shown in FIG. 3, at full insertion of internal assembly 114, FRC 116 curves back to connect to UI PCB 136. The S-shaped folded configuration of FRC 116 allows it to completely fit into housing 112.

Ribbon cables are well suited for such applications because they are relatively flat and can be folded to a certain degree without damaging the wires within the ribbon cable. However, other cables or structures that are sufficiently flexible and capable of providing an interconnection allowing power transfer connections, data transfer connections and/or signal transfer connections between the internal assembly and UI elements and provide power where needed may be used. In some embodiments, the ribbon cable may be a commercially available ribbon cable, and in other embodiments, the ribbon cable may be a specially fabricated ribbon cable having specific connectors. In certain embodiments, the ribbon cable may include any number of different wires.

FIG. 3 further shows a strain relief member 144 coupled to primary PCB 132 to assist FRC 116 with folding in the desired configuration. Strain relief member 144 may be adapted to interact with flexible middle portion 140 of FRC 116. FRC 116 can be affixed to strain relief member 144 prior to insertion. Upon insertion of internal assembly 114 into housing 112, FRC 116 will fold back over itself, pass over second end portion 142, and subsequently fold back to UI PCB 136 where first end portion 138 is attached. Thus, after coupling FRC 116 to strain relief member 144, a section of flexible middle portion 140 will run substantially parallel to primary PCB 132 before bending back. This arrangement allows enough length for connecting FRC 116 to internal assembly 114 outside of housing 112 but also allows FRC 116 to consistently and reliably make an S-shape, and nest inside housing 112 after internal assembly 114 is completely inserted. Strain relief member 144 can also prevent accidental dislodgment of FRC 116 from primary PCB 132.

Strain relief member 144 can be formed by an adhesive, such as double-sided tape, as shown in FIGS. 1 and 3. In other embodiments, single sided tape, clamps, brackets, clips, or other suitable fasteners can be used. In some embodiments, FRC 116 can engage with primary PCB 132 via multiple strain relief members. In other embodiments, additional strain relief members can be coupled to other components of the assemblies.

In some embodiments, in addition to soldering first end portion 128 of FRC 116 to UI PCB 136, a constraint member 158 may couple FRC 116 to UI PCB 136. For example, double-sided adhesive tape can be applied to prevent first end portion 138 from disconnecting when it is pulled out to connect its second end 142 to a connector on the primary PCB 132. Similar to strain relief member 144 described above, constraint member 158 applied to first end portion 128 will assist FRC 116 with proper bending and folding to nest inside housing 112.

The inventive subject matter further contemplates a method for assembling a power device. The steps below are described with reference to components described above with regard to the device illustrated in FIGS. 1-5. According to the method, a tubular housing is provided having a user interface assembly coupled to an inside surface of the tubular housing. An internal assembly of functional components for the power device including a printed circuit board is adapted to be disposed in the tubular housing. A flexible ribbon cable is provided for interconnecting the user interface assembly and the internal assembly. The flexible ribbon cable is coupled to the user interface assembly such that it extends out of a bottom portion of the tubular housing prior to insertion of the internal assembly thereby allowing enough length for connecting the flexible ribbon cable outside of the housing to the internal assembly. The internal assembly is inserted into the tubular housing resulting in the flexible ribbon cable making a curved configuration. The flexible ribbon cable nests inside the tubular housing after the internal assembly is completely inserted without interfering with operation of the internal assembly. In some embodiments, a strain relief member is coupled to the internal assembly and interacting with the flexible ribbon cable to promote formation of the curved configuration in a desired direction and to prevent accidental dislodgment of the flexible ribbon cable. In some embodiments, the user interface assembly includes one or more user interface elements integrated with the tubular housing and the flexible ribbon cable is coupled to one or more user interface elements.

The method for assembling a power device allows an efficiently assembly operation which can be completed manually with variations in technique between operators. Furthermore, the assembly process allows the interconnect cable to be coupled to the user interface assembly in a tight space.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Applicant(s) reserves the right to submit claims directed to combinations and sub-combinations of the disclosed inventions that are believed to be novel and non-obvious. Inventions embodied in other combinations and sub-combinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. An electric toothbrush comprising:

a tubular housing;

a user interface assembly connected to the tubular housing;

an internal assembly adapted to be inserted into the tubular housing by sliding the internal assembly along a longitudinal axis of the tubular housing;

a flexible ribbon cable adapted to interconnect the user interface assembly and internal assembly, and having a first end portion coupled to the user interface assembly, a flexible middle portion having a predetermined length that allows a second end portion of the flexible ribbon cable to extend out of a bottom portion of the tubular housing prior to insertion of the internal assembly into the tubular housing and that allows the second end portion of the flexible ribbon cable to be operatively coupled to the internal assembly when the internal assembly is at least partially outside of the housing; and wherein, during insertion of the internal assembly into the housing, the flexible ribbon cable folds into a curved shape such that the flexible ribbon cable nests inside the tubular housing after the internal assembly is completely inserted and the flexible ribbon cable does not interfere with operation of the internal assembly.

2. The electric toothbrush of claim 1, wherein the curved shape includes an S-shape.

3. The electric toothbrush of claim 1, further comprising a strain relief member coupled to the internal assembly and interacting with the flexible ribbon cable to promote formation of the curved shape in a desired direction.

4. The electric toothbrush of claim 3, wherein the strain relief member includes an adhesive connection.

5. The electric toothbrush of claim 1, wherein the user interface assembly is coupled to an inside surface of the tubular housing.

6. The electric toothbrush of claim 1, wherein the internal assembly includes a primary printed circuit board.

7. The electric toothbrush of claim 1, wherein the user interface assembly includes one or more user interface elements integrated with the tubular housing and the flexible ribbon cable is coupled to at least one of the one or more user interface elements.

8. A method for assembling an electric toothbrush comprising:

providing a tubular housing;

providing a user interface assembly and coupling the user interface assembly to an inside surface of the tubular housing;

providing an internal assembly and configuring the internal assembly to be disposed in the tubular housing;

providing a flexible ribbon cable for interconnecting the user interface assembly and the internal assembly;

coupling the flexible ribbon cable to the user interface assembly such that it extends out of a bottom portion of the tubular housing prior to insertion of the internal assembly thereby allowing enough length for connecting the flexible ribbon cable outside of the housing to the internal assembly;

inserting the internal assembly into the tubular housing resulting in the flexible ribbon cable making a curved configuration; and having the flexible ribbon cable nested inside the tubular housing after the internal assembly is completely inserted without interfering with operation of the internal assembly.

9. The method of claim 8, wherein the internal assembly includes a primary printed circuit board.

10. The method of claim 8, wherein the internal assembly further comprises a strain relief member coupled to the internal assembly and interacting with the flexible ribbon cable to promote formation of the curved configuration in a desired direction.

11. The method of claim 8, wherein the user interface assembly includes one or more user interface elements integrated with the tubular housing and the flexible ribbon cable is coupled to at least one of the one or more user interface elements.

* * * * *